Feb. 13, 1951     J. ROBINSON     2,541,292
HYDRAULIC POWER TRANSMISSION SYSTEM
Filed Aug. 30, 1946
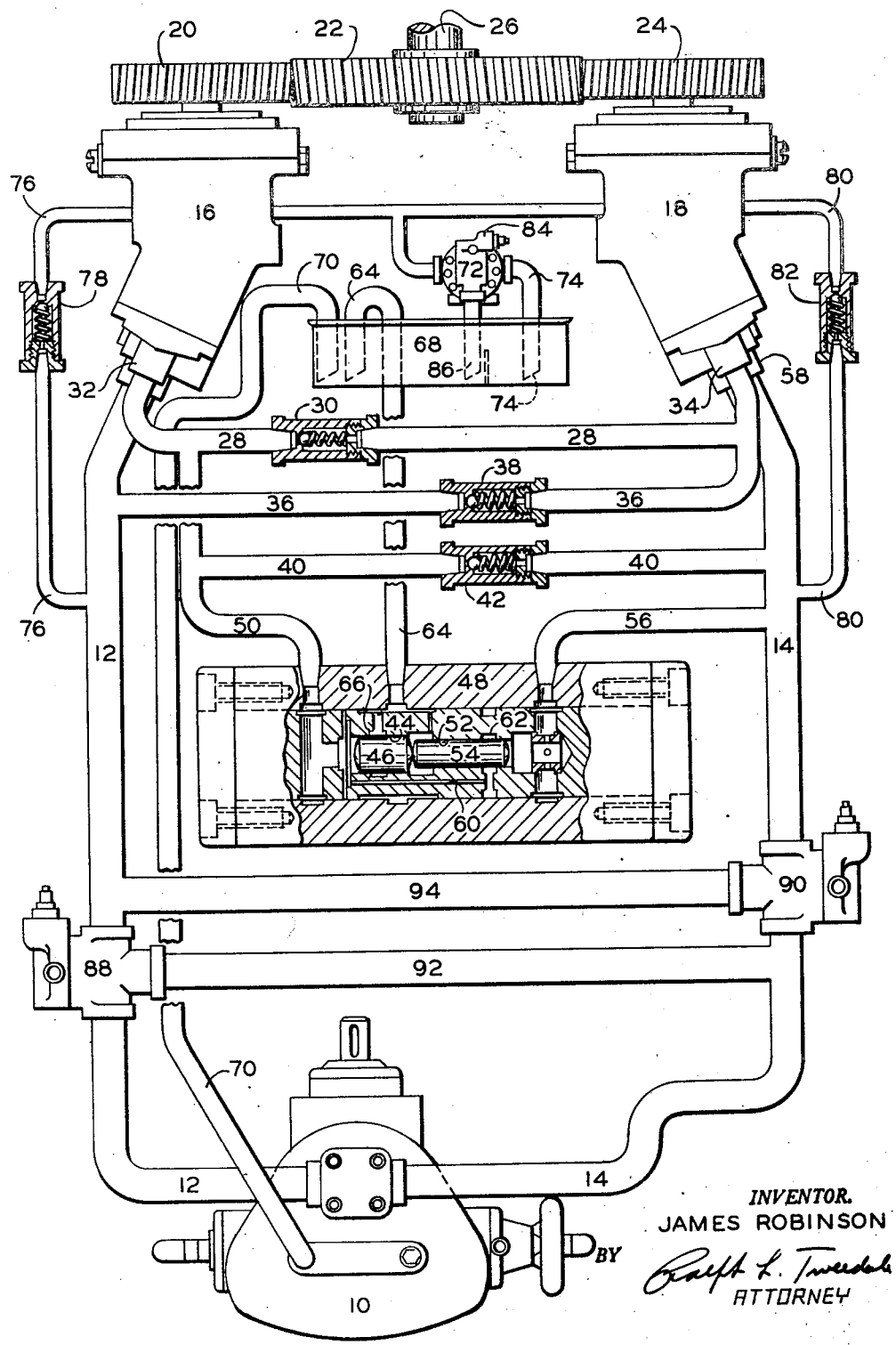
INVENTOR.
JAMES ROBINSON
BY Ralph L. Tweedale
ATTORNEY Patented Feb. 13, 1951

2,541,292

UNITED STATES PATENT OFFICE 2,541,292

HYDRAULIC POWER TRANSMISSION SYSTEM

James Robinson, Huntington Woods, Mich., assignor to Vickers Incorporated, Detroit, Mich., a corporation of Michigan Application August 30, 1946, Serial No. 693,988

4 Claims. (Cl. 60—53)

This invention relates to power transmissions, particularly to those of the type comprising two or more fluid pressure energy translating devices, one of which may function as a pump and another as a fluid motor.

More particularly, the proposed transmission is designed for transmitting power to an engine during starting operations and subsequently when the engine has reached its normal operating speed, to be driven by that engine. A standard hydraulic transmission of this character would comprise a pump driven by a prime mover and hydraulically connected to a motor which in turn is coupled to an engine. When the engine reaches its normal operating speed, its power output is greater than the tranmission input and as a result the engine may drive the prime mover through the transmission, the pump functioning as a motor, and the motor coupled to the engine operating as a pump to drive the transmission.

Therefore, the basic object of this invention is to provide a transmission adapted to transmit power in either direction depending upon the predominating power input at either end.

Under certain conditions and especially when the engine to be started normally operates at very high speeds and low torque, the design of a hydraulic transmission to operate efficiently both at high torque starting speeds and at low torque high operating speeds presents many problems. Low speed motors and pumps are especially efficient at high torque operation, while high speed units are generally employed for low torque operation.

In the proposed invention, one of the objects is to provide a transmission incorporating the power efficiency of low speed and high torque with the power efficiency of low torque and high speeds.

Multiple hydraulic motors connected in parallel to a single pump and mechanically coupled to a load device will develop a torque equal to the sum of the torques in the individual motors and at a reduced speed indirectly proportional to the number of motors connected in parallel. Summarily, the greater the number of motors connected in parallel, the higher the torque and lower the speed.

Therefore, another object of this invention is to provide a transmission employing multiple motors in parallel for operating an engine at low starting speeds.

By connecting the same motors in series wherein the entire capacity of the pump must pass through each motor, it is evident that each motor will operate at higher speeds. Compared with the parallel connection as described above, each series motor under the latter condition would operate at a speed equal to the sum of the speeds of all the motors operating in parallel. Since torque is inversely proportioned to speeds in the series connection, lower torque would be the balancing factor of high speeds. The same condition prevails whether dealing with hydraulic motors or pumps.

It will therefore be seen how connecting the motors in parallel will supply the desired power for starting an engine at slow starting speeds. The condition which normally prevailed is the requirement of shifting from parallel to series operation to continue driving the engine at higher speeds until it reaches its own critical point of developing power to continue operating independently of the transmission. Under the present problem, the engine was brought to its critical speed by the parallel motor circuit. Beyond that point the engine is the predominating driver and in transmitting power in the opposite direction, the aforesaid motors must now function as pumps. The single pump coupled to the starting prime mover must now function as a motor for transmitting power into the prime mover as a generator or load device.

Since the engine in the proposed problem is presumed to operate at very high speeds and, further, since the feed-back power demand from the engine is low, these requirement call for high speed, low torque operation. In other words, it would be desirable to utilize the multiple motors as pumps providing they can automatically be connected in series when the engine is driving the transmission.

Therefore, another object of this invention is to provide a transmission employing multiple hydraulic motors connected in parallel for starting an engine but adapted to be connected and operate in series as pumps when the power output of the engine exceeds the input of the transmission.

Other objects include the provision of parallel and series circuits and means for controlling the circuits whereby they may operate independently and without interference.

Another object is to provide means for equalizing the loads on each of the multiple pumps when operating in series.

Further objects and advantages of the present invention will be apparent from the following description, reference being had to the accompanying drawing wherein a preferred form of the present invention is clearly shown.

In the drawing:

The single figure is a diagrammatic view of a power transmission system incorporating a preferred form of the present invention.

In detail, the tranmission comprises a pump 10 driven by a prime mover, not shown, and connected by pressure and return conduits 12 and 14, respectively, to multiple hydraulic motors 16 and 18. The motors are mechanically coupled through gears 20, 22, and 24 to a drive shaft 26 coupled to an engine, not shown.

An intermediate series conduit 28 provided with a check valve 30 connects and limits the direction of flow from the outlet 32 of the first stage motor-pump 16 to the inlet 34 of the second stage motor-pump 18. A parallel branch conduit 36 connects pressure conduit 12 to the inlet 34 of motor 18 and is provided with a check valve 38 limiting the flow to the one direction, namely, toward the inlet 34. A parallel branch conduit 40 connects the outlet 32 to the return conduit 14 and is provided with a check valve 42 limiting the direction of flow toward conduit 14.

The low pressure cylinder 44 and piston 46 of pressure dividing valve 48 are connected by conduit 50 to the intermediate conduit 28 at a point between the outlet 32 of the first stage pump 16 and the check valve 30. The high pressure cylinder 52 and piston 54 of the pressure dividing valve 48 are connected by conduit 56 to return conduit 14 which in turn is connected to the outlet 58 of the second stage pump 18. Passage 60 connects the head end of the low pressure cylinder 44 to high pressure port 62. A drain conduit 64 connects low pressure cylinder port 66 of the dividing valve 48 to tank 68.

A drain line 70 connects the case of pump 10 to tank 68. A replenishing pump 72 is connected for sucking fluid from tank 68 through conduit 74 and deliver replenishing fluid by conduit 76 and check valve 78 to pressure conduit 12 or by conduit 80 and check valve 82 to return conduit 14 to whichever conduit is below operating or replenishing pressure. The replenishing pump 72 is provided with an overload relief valve 84 and drain line 86. Relief valves 88 and 90 are connected by conduits 92 and 94, respectively, between the pressure and return conduits 12 and 14 for relieving excessive pressure from one line to the other.

In operation during the starting cycle, the pump 10 is adapted to drive the multiple motors 16 and 18 in unison through parallel circuits in order to develop high starting torques and lower speeds. Pressure fluid is delivered by conduit 12 to motor 16 direct and to motor 18 through the parallel branch conduit 36 and check valve 38. Discharge from motor 18 is directly into return conduit 14 and from motor 16 to conduit 14 by way of the branch parallel conduit 40 and check valve 42.

So long as the power input of pump 10 is greater than the input from engine shaft 26 through the motor-pump units 16 and 18, the pressure in conduit 12 will be greater than the pressure in conduit 14. Under that condition, the parallel circuit alone is free to conduct operating fluid. For example, the discharge from motor 16 cannot continue through the series circuit intermediate conduit 28 to the inlet of motor 18 because it is pressure blocked at check valve 30 since the right side of check valve 30 is subjected to full operating pressure from conduit 12 through branch 36 and check valve 38. If it were not for check valve 30 when the pressure in conduit 12 is higher than in conduit 14, pressure fluid delivered by the pump 10 would follow the path of least resistance through conduit 36, check valve 38, conduit 28, conduit 40, check valve 42 and conduit 14 back to the pump 10 thereby by-passing the motors.

When the engine shaft 26 reaches the point where the input power from the engine is greater than that delivered by the pump 10, then the motors 16 and 18 function as pumps to drive the transmission and the pump 10, which functions as a motor. Therefore, the return conduit 14 becomes the pressure conduit and conduit 12, the return conduit. Under the latter pressure condition, check valves 38 and 42 are pressure blocked and pressure fluid from the first stage pump 16 will flow through conduit 28 and check valve 30 to inlet 34 of the second stage pump 18.

If check valve 38 had not been provided in the parallel branch conduit 36, discharge pressure fluid from the first stage series pump 16 would take the path of least resistance and re-circulate through pump 16 by following conduit 28, check valve 30 and conduit 36 back to conduit 12 and the inlet of pump 16 thus by-passing the second stage pump 18 and motor 10. In the same manner, if check valve 42 had not been provided, pressure fluid from the outlet 58 of the second stage pump 18 would be re-circulated through conduit 14, conduit 40, conduit 28 and check valve 30 to the inlet 34 of pump 18 thus by-passing the motor 10 and first stage pump 16.

When the multiple pumps 16 and 18 are being driven by the engine gearing 20 and 24 and operating in series, provisions for equalizing the load or pressure rise through each pump is desirable. The pressure dividing valve performs this function by maintaining a pressure in the intermediate conduit 28 in direct relative proportion to the operating pressure in conduit 14. Assuming that the pressure in intermediate conduit 28 was to be maintained at one-half the pressure in conduit 14, then the high pressure piston 54 will have half the area of the low pressure piston 46.

Therefore, if the pressure in conduit 28 is relatively excessive, the piston 46 will be shifted to the right and relieve the excess pressure through port 66 and conduit 64 to tank. On the other hand, if the relative pressure in conduit 28 is low, piston 54 will move to the left as shown in the drawing thereby admitting pressure from conduit 14 through port 62, passage 60 and conduit 50 to conduit 28 until a differential pressure balance is reached of the same proportion as the differential piston areas.

It will thus be seen that the present invention has provided a transmission particularly suitable for driving engines during high torque, low speed starting operations and yet be driven by that same engine at high speed when low torques prevail. This has been accomplished by employing multiple motor-pump units connected by parallel and series circuit conduits and provided with pressure actuated check valves for blocking the series circuit during starting operations or blocking the parallel circuit when the transmission is being driven by the engine when it reaches higher operational speed.

While the form of embodiment of the invention as herein disclosed constitutes a preferred form, it is to be understood that other forms might be adopted, all coming within the scope of the claims which follow.

What is claimed is as follows:

1. A hydraulic transmission comprising a variable displacement pump adapted to operate also as a motor, multiple fixed displacement motors adapted to operate also as pumps, and conduits connecting the pump and motors whereby the multiple motors operate as motors in parallel and as pumps in series, including an intermediate series conduit connecting the outlet of one of the multiple motors to the inlet of the next adjacent motor in series, a branch supply conduit connecting the outlet of the variable displacement pump to the inlet of the second stage multiple motor in parallel with the first stage motor, a branch discharge conduit connecting the outlet of the first stage multiple motor to the inlet of the variable displacement pump, and check valves in the branch conduits to block re-circulating flow through each of the multiple motors and prevent by-passing the variable displacement pump when normally adapted to function as a motor during series operation.

2. A hydraulic transmission comprising a variable displacement pump adapted to operate also as a motor, multiple fixed displacement motors adapted to operate also as pumps, and conduits connecting the pump and motors whereby the multiple motors operate as motors in parallel and as pumps in series, including an intermediate series conduit connecting the outlet of one of the multiple motors to the inlet of the next adjacent motor in series, a branch supply conduit connecting the outlet of the variable displacement pump to the inlet of the second stage multiple motor in parallel with the first stage motor, a branch discharge conduit connecting the outlet of the first stage multiple motor to the inlet of the variable displacement pump, and check valves in the branch conduits to block re-circulating flow through each of the multiple motors and prevent by-passing the variable displacement pump when normally adapted to function as a motor during series operation, and a pressure dividing valve for maintaining equal pressure differentials across each of the multiple motors when operating as pumps in series.

3. A hydraulic transmission adapted to drive an engine during starting operations and be driven by that engine after reaching its normal operating speed, comprising a variable displacement pump, two motors mechanically coupled to an engine and hydraulically connected by parallel branch lines to the pump, means connecting the motors to operate as pumps in series to drive the variable displacement pump as a motor when the motors are driven by the engine and including a conduit and check valve connecting but limiting the direction of flow from the outlet of the first motor to the inlet of the second motor, a check valve in the parallel circuit branch line connecting the outlet of the variable displacement pump to the inlet of the second motor, and a check valve in the parallel branch line connecting the outlet of the first motor to the inlet of the pump.

4. A hydraulic transmission adapted to drive an engine during starting operations and be driven by that engine after reaching its normal operating speed, comprising a variable displacement pump, two motors mechanically coupled to an engine and hydraulically connected by parallel branch lines to the pump, means connecting the motors to operate as pumps in series to drive the variable displacement pump as a motor when the motors are driven by the engine and including a conduit and check valve connecting but limiting the direction of flow from the outlet of the first motor to the inlet of the second motor, a check valve in the parallel circuit branch line connecting the outlet of the variable displacement pump to the inlet of the second motor, and a check valve in the parallel branch line connecting the outlet of the first motor to the inlet of the pump, and a conduit connecting the outlet of the first motor to the outlet of the second motor and provided with a pressure dividing valve for equalizing the pressure drop across each motor when mechanically driven as pumps in series.

JAMES ROBINSON.

REFERENCES CITED

The following references are of record in the file of this patent:

UNITED STATES PATENTS

| Number | Name | Date |
|---|---|---|
| 2,079,268 | Wiedmann | May 4, 1937 |

FOREIGN PATENTS

| Number | Country | Date |
|---|---|---|
| 184,455 | Great Britain | Oct. 18, 1923 |